United States Patent
Boni

(10) Patent No.: US 7,044,176 B2
(45) Date of Patent: May 16, 2006

(54) DEVICE FOR CONTROLLED ACTIVATION OF THE PRESSURIZED SUPPLY OF AIR FOR INFLATING TIRES IN MACHINES FOR TIRE DEALERS

(75) Inventor: Dido Boni, Reggio Emilia (IT)

(73) Assignee: SICAM S.r.l., Correggio (IT)

( * ) Notice: Subject to any disclaimer, the term of this patent is extended or adjusted under 35 U.S.C. 154(b) by 0 days.

(21) Appl. No.: 10/827,258

(22) Filed: Apr. 20, 2004

(65) Prior Publication Data

US 2004/0221917 A1 Nov. 11, 2004

(30) Foreign Application Priority Data

May 7, 2003 (IT) .................................. MO2003A0130

(51) Int. Cl.
*B65B 31/00* (2006.01)

(52) U.S. Cl. ........................... 141/38; 141/95; 141/197; 152/415; 157/1.1; 137/224

(58) Field of Classification Search ................. 141/4, 141/38, 46–50, 83, 94, 95, 98, 197; 137/223, 137/224, 488, 492; 157/1; 152/415, 427
See application file for complete search history.

(56) References Cited

U.S. PATENT DOCUMENTS 5,168,911 A 12/1992 Gottschalk
5,293,910 A * 3/1994 Mohs ........................... 141/38
5,967,198 A * 10/1999 Smalley ........................ 141/38
6,655,925 B1 * 12/2003 Robenalt et al. ............. 417/234

FOREIGN PATENT DOCUMENTS

DE 690 823 C 5/1940
EP 1 308 322 A 5/2003

* cited by examiner

Primary Examiner—Timothy L. Maust
(74) Attorney, Agent, or Firm—Guido Modiano; Albert Josif; Daniel O'Byrne

(57) ABSTRACT

A device for controlled activation of the pressurized supply of air for inflating tires in machines for tire dealers comprising air feeders, at least one pair of regulators for air pressure regulation to two predefined extreme values, a first regulator to a minimum value and a second regulator to a maximum value, the regulators being connected in parallel to each other to the air feeders, at least one dispenser for dispensing pressurized inflation air connectable alternately to one of the regulators, at least one selection valve, interposed between the first and second regulators and the dispenser for selecting alternate connection of the dispenser to the regulators, the selection valve being kept, by a return element, normally connected to the first regulator and forcibly temporarily connectable, in contrast with the return element, to the second regulator, interruption of direct actuation causing automatic reconnection of the selection valve to the first regulator.

7 Claims, 1 Drawing Sheet

DEVICE FOR CONTROLLED ACTIVATION OF THE PRESSURIZED SUPPLY OF AIR FOR INFLATING TIRES IN MACHINES FOR TIRE DEALERS

The present invention relates to a device for controlled activation of the pressurized supply of air for inflating tires in machines for tire dealers.

BACKGROUND OF THE INVENTION

In the work performed by tire dealers, it is sometimes necessary to work on tires that have different characteristics and dimensions depending on the vehicle on which they are fitted and on the use of said vehicle.

Tire inflation pressures therefore have widely different values and the machines used by tire dealers must be able to supply air at these pressures in order to be able to inflate the tires correctly, for example after replacement or other maintenance.

On the other hand, standards require tire dealers to work in conditions of absolute safety, avoiding the risks of accidental bursting normally caused by the introduction of air in overpressure in the tires.

Such pressures can be supplied by a tank, with which tire changing machines are normally provided and in which the air is kept at values on the order of 9–10 bars, or by an external supply source.

A limiting valve fitted on the pneumatic circuit of the machines downstream of said tank or of the coupling to said external supply source allows to reduce said pressure to the nominal values set by tire manufacturers, normally intended for cars or light utility vehicles, on the order of 3–3.5 bars; this reduction is explicitly necessary because the introduction of air at pressures above said values would cause deformation of the carcass of said tires.

However, in the use of said machines to inflate the tires of trucks, so-called derivative vehicles or building-yard machines, the pressures required are significantly higher, on the order of 6 bars, and therefore said machines must be equipped not only with appropriate and mandatory safety systems designed to lock the wheels thereon in case of accidental bursting of the tires during inflation, but also with devices that allow to supply compressed air at both of said values and as required.

These known devices substantially consist of a valve element that is interposed on the pneumatic circuit between the tank and the so-called inflation gun and has two operating positions that can be selected by the operator: a first position, on a lower pressure value, which is generally suitable for car tires, and a second higher value for tires of trucks and building-yard machines.

However, during normal work, between one operation and the next said valve element may be accidentally left in the position for supplying air at higher pressure, i.e., around 6 bars, while the tire dealer is about to inflate a car tire, for which the maximum allowed pressure is approximately 3.5 bars, with consequent instant damage to the carcass of the tire due to the pressure shock or, worse still, with bursting of said tire and severe risk for the safety of the tire dealer, who is practically in direct contact with the machine and with the tire.

As an alternative, if said valve elements are not used on a single machine, it is necessary to have two machines for the same function, for example for fitting and removing tires, one of said machines being provided with a pneumatic system set to a lower pressure value and one being provided with a pneumatic system set to the higher pressure value: in this case, as mentioned, it is necessary to provide specific burst protection devices in association with the machines.

In this second case, the costs for this availability are doubled.

SUMMARY OF THE INVENTION

The aim of the present invention is to eliminate the drawbacks noted above of the background art, by providing a device for controlled activation of the pressurized supply of air for inflating tires in machines for tire dealers, which allows said tire dealers to work in maximum safety for themselves and for the structure of the tires, achieving both of these goals with a single machine in order to contain overall costs.

This aim and this and other objects that will become better apparent hereinafter are achieved by the present device for controlled activation of the pressurized supply of air for inflating tires in machines for tire dealers as defined in the appended claims.

BRIEF DESCRIPTION OF THE DRAWINGS

Further characteristics and advantages of the present invention will become better apparent from the following detailed description of a preferred but not exclusive embodiment of a device for controlled activation of the pressurized supply of air for inflating tires in machines for tire dealers, illustrated by way of non-limiting example in the accompanying drawings, wherein.

DESCRIPTION OF THE PREFERRED EMBODIMENTS

Figure 1:
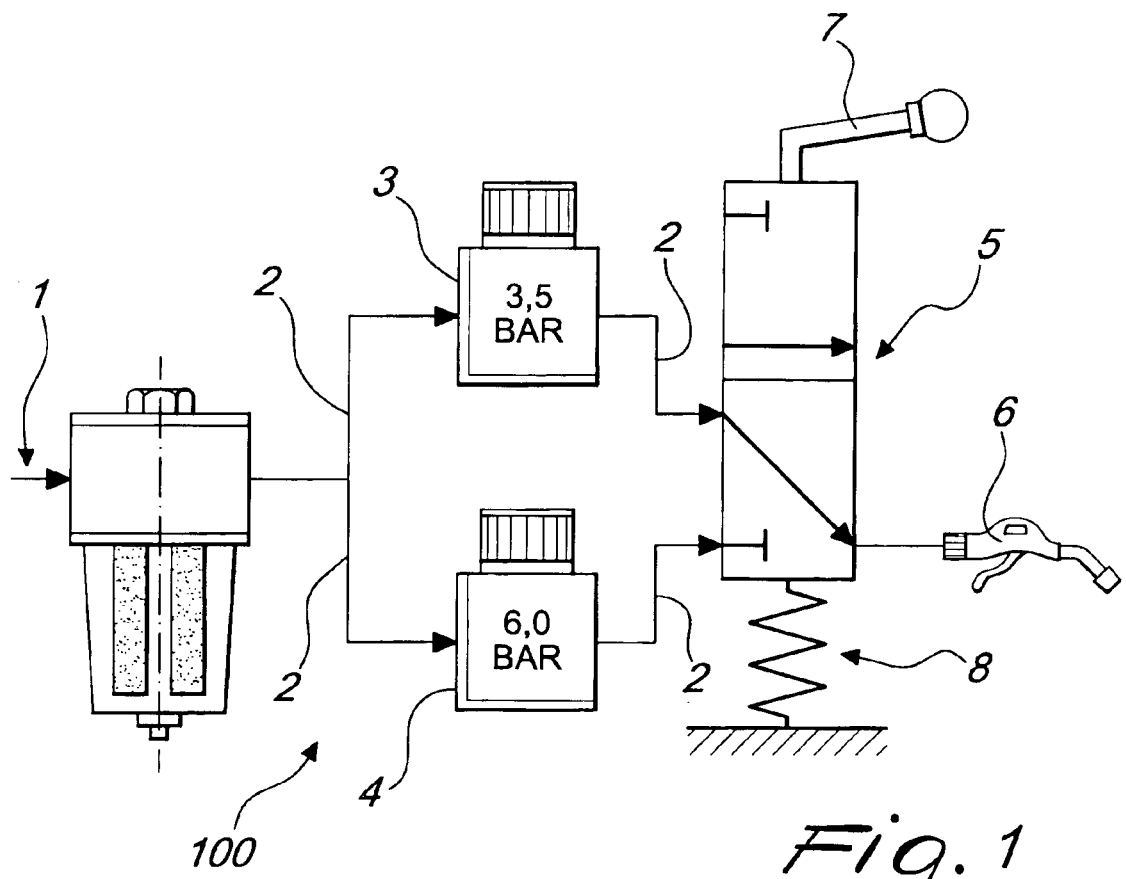
FIG. 1 is a diagram of the pneumatic system of the device for controlled activation of the overpressure supply of air for inflating tires in machines for tire dealers according to the invention, in a configuration for the normal dispensing of air at a minimum pressure value.

With reference to the figures, the reference numeral 100 designates a device for controlled activation of the overpressure supply of air for inflating tires in machines for tire dealers, which is composed of a feeder means for supplying air under pressure, for example a tank 1 or an external source, which by way of respective branches of a pneumatic line 2 is connected in parallel to two pressure regulator means constituted, for example, by regulators, respectively a first regulator 3, which is set to a lower pressure, approximately 3.5 bars, and a second pressure regulator 4, which is set to a higher pressure, approximately 6 bars.

A selection valve means, constituted, for example, by a selector valve element 5 is provided in output to the first and second regulator means 3 and 4, which are connected to said selector valve element by means of the extensions of said branches of the pneumatic line 2; downstream of the valve means 5 there is a means 6 for dispensing air for inflation, which is normally constituted by a so-called inflator gun.

The valve means 5 is of the type with two positions and can move between one position and the other by being actuated from outside by an operator by means of a pushbutton or a lever 7 and in contrast with return means 8, which are normally of the elastic type; the pushbutton or lever 7 is preferably arranged on a control panel of a machine for tire dealers, for example a tire changing machine.

In the position for normal use of the device 100 according to the invention, shown in FIG. 1, the valve means 5 directly connects the dispensing means 6 to the first regulator means 3, which provides pressurized inflation air at a value, approximately 3.5 bars, that is lower than that of the accumulation tank 1 or of the external source (approximately 9–10 bars): in this configuration, the second regulator means 4 is disconnected and the tire dealer can inflate the tires, for example of a car, with the assurance that the value of 3.5 bars cannot be exceeded, because the first regulator means 3 would be activated, interrupting the pressurized air supply flow.

Figure 2:
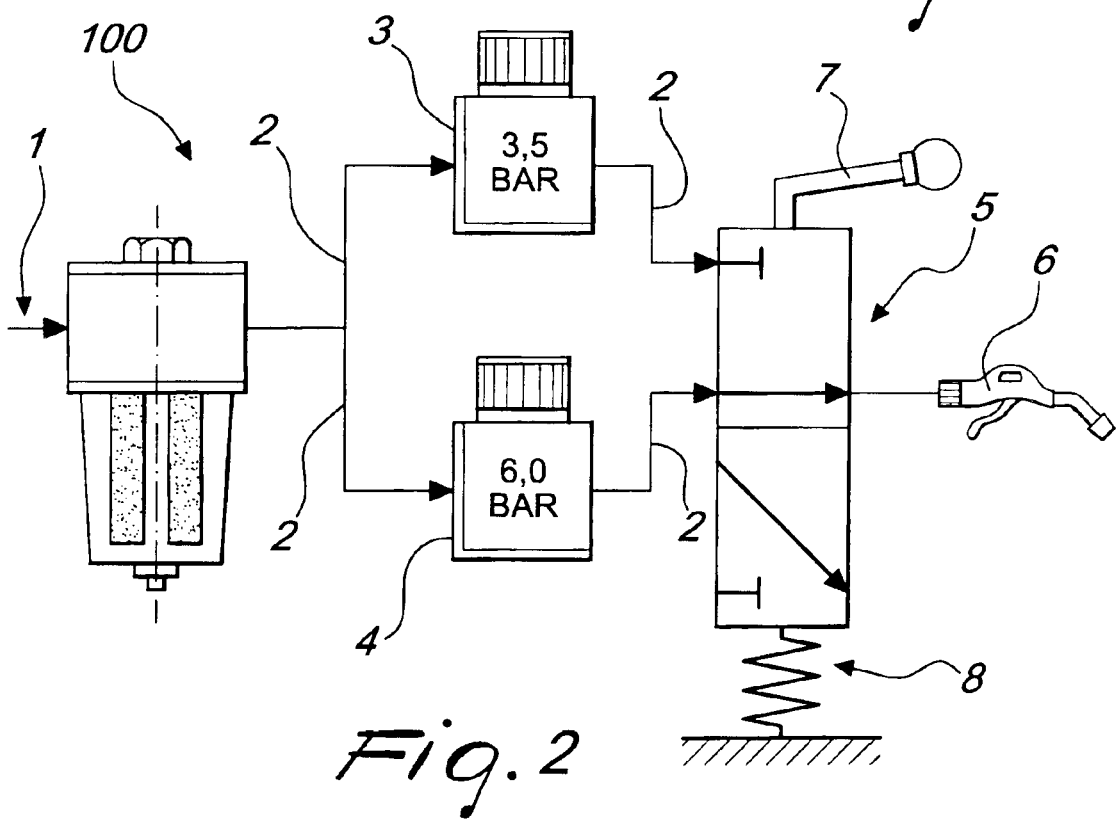
FIG. 2 is an end portion of the diagram of FIG. 1, in a configuration for dispensing air in overpressure.

When the availability of inflation air at a higher pressure is functionally required, the tire dealer acts on the lever 7, moving and retaining intentionally and forcibly the valve means 5 in the second possible configuration, which is shown in FIG. 2 and in which the dispensing means 6 is connected directly to the second regulator means 4, which is set to approximately 6 bars, while the first regulator means is disconnected; the forced action of the tire dealer loads the return means 8 and keeps it loaded for the entire time interval required by the intervention.

As soon as the tire dealer intentionally or accidentally releases the lever 7 (or the pushbutton), the valve means 5, subjected to the action of the return means 8 loaded by the movement of the valve means 5, returns to the initial condition of normal supply of air at the lower pressure, i.e., at 3.5 bars.

In practice it has been found that the described invention achieves the proposed aim and object.

The invention thus conceived is susceptible of numerous modifications and variations, all of which are within the protective scope as defined by the content of the appended claims.

All the details may further be replaced with other technically equivalent ones.

In practice, the materials used, as well as the shapes and the dimensions, may be any according to requirements without thereby abandoning the scope of the protection of the present invention.

The disclosures in Italian Patent Application No. MO2003A000130 from which this application claims priority are incorporated herein by reference.

What is claimed is:

1. A device for controlled activation of a pressurized supply of air for inflating tires in a machine for tire dealers, comprising:
    a feeder means for supplying and/or accumulating pressurized inflation air;
    at least one pair of regulator means for regulating the pressure of said inflation air to two predefined extreme values, a first regulator means to a lower value and a second regulator means to a higher value, said regulator means being connected in parallel to each other to said feeder means;
    at least one dispensing means for dispensing pressurized inflation air that is connectable alternately to one of said pressure regulator means;
    return means; and
    at least one selection valve means, which is interposed between said first regulator means and said second regulator means and said dispensing means for selecting an alternate connection of said dispensing means to said first regulator means or second regulator means, said selection valve means being kept, by way of said return means, normally connected to said first regulator means and being intentionally forcibly and temporarily connectable, by direct actuation of an operator and in contrast with said return means, to said second regulator means, interruption of said direct actuation of the operator causing automatic reconnection of said selection valve means to said first regulator means.

2. The device of claim 1, wherein said selection valve means is provided with an actuation lever, said lever being arrangeable on a control panel of the machine.

3. The device of claim 1, wherein said selection valve means is provided with an actuation pushbutton, said pushbutton being arrangeable on a control panel of the machine.

4. The device of claim 1, wherein said return means is constituted by elastic means that are loadable by way of said actuation lever.

5. The device of claim 1, wherein said minimum value is comprised between 2.5 and 3.5 bars.

6. The device of claim 1, wherein said maximum value is comprised between 5.5 and 6.5 bars.

7. The device of claim 1, wherein pressure of the inflation air contained in said feeder means is higher than said upper value of said second regulator means.

* * * * *